(12) United States Patent
Zewde et al.

(10) Patent No.: US 7,647,778 B2
(45) Date of Patent: Jan. 19, 2010

(54) ENGINE ARRANGEMENTS AND CONTROL

(75) Inventors: Netsebrak T Zewde, Derby (GB); Arthur L Rowe, Derby (GB)

(73) Assignee: Rolls-Royce plc, London (GB)

( * ) Notice: Subject to any disclaimer, the term of this patent is extended or adjusted under 35 U.S.C. 154(b) by 503 days.

(21) Appl. No.: 11/591,552

(22) Filed: Nov. 2, 2006

(65) Prior Publication Data
US 2007/0137214 A1  Jun. 21, 2007

(30) Foreign Application Priority Data
Nov. 16, 2005 (GB) ................................. 0523337.4

(51) Int. Cl.
*F02C 9/18* (2006.01)
(52) U.S. Cl. .......................................... 60/779; 60/795
(58) Field of Classification Search .............. 60/39.091, 60/772, 779, 785, 795, 802
See application file for complete search history.

(56) References Cited

U.S. PATENT DOCUMENTS

| | | | |
|---|---|---|---|
| 4,380,893 A | | 4/1983 | Stokes |
| 4,756,152 A | * | 7/1988 | Krukoski et al. .............. 60/773 |
| 4,991,389 A | * | 2/1991 | Schafer ...................... 60/39.24 |
| 5,042,245 A | | 8/1991 | Zickwolf, Jr. |
| 5,867,979 A | * | 2/1999 | Newton et al. ............. 60/226.1 |
| 6,231,306 B1 | | 5/2001 | Khalid |

FOREIGN PATENT DOCUMENTS

| | | |
|---|---|---|
| GB | 2 273 316 A | 6/1994 |
| GB | 2 367 627 A | 4/2002 |

* cited by examiner

*Primary Examiner*—Louis J Casaregola
(74) *Attorney, Agent, or Firm*—Jeffrey S. Melcher; Manelli Denison & Selter PLLC

(57) ABSTRACT

It is known that power is normally extracted within a gas turbine engine from a shaft in order to drive auxiliary devices such as electrical power generators. With high extraction rates from such shafts there is mismatching in rotational speeds between the shafts which must be adjusted through leakage taken from valves 8, 9. By measuring parameters and in particular pressure at a number of positions or parts within an engine arrangement 1 and comparing those parameters either through ratios or directly with reference values a controller can be configured in order to choose the correct sequence and scheduling of the valves 8, 9 opening to balance shaft speed. In such circumstances more efficient operation of the engine arrangement can be achieved over a wider range of engine speeds including idling.

14 Claims, 3 Drawing Sheets

ENGINE ARRANGEMENTS AND CONTROL

FIELD OF THE INVENTION

The present invention relates to engine arrangements and control and more particularly to gas turbine engine arrangements and control with regard to aircraft propulsion.

BACKGROUND OF THE INVENTION

It will be understood that gas turbine engines are utilised with regard to aircraft in order to provide propulsion in order to drive the aircraft both on the ground as well as provide propulsion in the air. In such circumstances the power required will vary dependent upon the operational phase of the aircraft. It will also be understood that these gas turbine engines also provide power in order to drive electrical generators and other auxiliary devices such as hydraulic or fuel pumps for the aircraft and the engine itself. These generators and auxiliary devices are typically driven through a gear box drive coupling to a shaft of the engine.

Increasing use of electrical actuators and devices to provide auxiliary functions as well as greater use of electronic processor and other control devices can significantly increase the power generation requirements from electrical generators driven by the primary engine of an aircraft. It will also be understood that the power demands of electrical generators to supply sufficient electrical power to the control and other auxiliary devices can significantly vary between aircraft phases such as ground operations and in-flight cruising. Such variations significantly complicate engine control.

As indicated above typically electrical generators as well as other auxiliary devices will be driven through a gearbox coupling to a shaft within an engine. Normally, an engine arrangement will incorporate several shafts and therefore when power is taken from one shaft to drive electrical generators/machines and other auxiliary devices imbalances may occur within the engine.

A particular compressor geometry operating in a stable condition will have a unique relationship between the non dimensional flow and the operating pressure ratio between the rear and front of the compressor. This is called the working line. If the compressor is driven to operate at the same flow but a higher pressure ratio it will eventually surge. There is also a unique relationship between non dimensional flow and the pressure ratio for surge. This is called the surge line.

Handling bleed valves are used to control the operation of axial flow compressors. They are located either at the back of a compressor in which case they affect the working line of that compressor or they are located mid way through the compressor in which case they affect the working line and the surge (also known as stall) line of the compressor.

The traditional method of control of a handling bleed valve is by a bleed schedule. Engine parameters which can easily be measured such as shaft speed and temperature are used to calculate the compressor non dimensional flow giving a measure of where the compressor is operating in terms of surge etc. Because the available margin between the working line and surge line varies with flow it is possible to schedule bleed valves to open at certain flows and closed at other flows. The schedule is set up to maintain sufficient margin between the surge and working lines to account for all the variation in surge and working lines possible during service life of the engine.

During transient operation the compressor will move away from the steady state working line due to a variety of thermodynamic effects. In this case more margin is required and a separate transient bleed schedule is required. Further advances include separate bleed schedules for Approach Idle, Reverse thrust operation, detection of water ingestion and detection of surge. Each schedule is designed to alter the engine matching in the most advantageous way.

It is known to control the surge margin of a compressor based on thermodynamic changes that occur within that compressor. No account is taken of engine matching changes which occur outside that compressor. Recent requirements for the aerospace gas turbines to provide very large levels of core power to the aircraft electrical generators can cause problems. Typically, the power requirements have gone from around 300 hp to over 800 hp. In addition these power requirements must be able to be provided at any time by the gas turbine with no prior knowledge or warning.

The power extraction is taken using one or more generators that are attached directly to the engine by means of a gearing system which is connected to one of the shafts. A drag force caused by the generators generating electricity is applied directly to the shaft in question. This means that some proportion of the power from the turbine attached to that shaft is used in providing power off take rather than driving the compressor on that shaft. The result is that for a given set of compressor inlet conditions the pressure ratio driven by the compressor will be lower i.e. the working line will drop.

For multi shaft engines being controlled to a constant thrust the drop in the working line of one of the compressors will result in more fuel being introduced and a consequent increase in the speed of the unloaded shaft or shafts. The precise rematching of the engine will depend on the exact engine configuration and the environmental conditions in terms of altitude and mach number.

Large power off take causes particular problems at low engine powers and using prior engine bleed control methods would force an unacceptably high minimum idle level or alternatively limit the practical level of power off take to a level significantly below desired requirements. Even a slightly raised idle level would be unacceptable because it would impact the aircraft's ability to manoeuvre during descent, would cause brake wear and other safety issues during taxi operations and would give a very high mission fuel burn penalty.

SUMMARY OF THE INVENTION

In accordance with certain aspects of the present invention there is provided a method of controlling a gas turbine engine comprising a number of compressor stages, the method comprising determining a parameter for each of a number of parts of the engine, comparing each parameter with a reference value for that part of the engine and adjusting a bleed device for one or more stages of the engine dependent upon the comparison of the parameter with the reference value, characterised in that the comparison is simultaneous and one parameter comparison has the authority to override the other to adjust the bleed valve.

Normally, the parameter is flow pressure within the part of the engine.

Typically, the parameter comprises a pressure ratio between parts of the engine is utilised to provide a reference for adjusting the bleed valve.

Preferably, the part is across at least one stage of at least one compressor. The at least one compressor is any one of the IP or HP compressors.

Preferably, the engine shaft speed is utilised to provide a reference for adjusting the bleed valve. The engine shaft is any one of the HP, IP or LP shafts.

Preferably, the pressure ratio parameter overrides the engine speed parameter to progressively adjust the bleed valve.

Alternatively, the stages of the engine are defined by the shafts.

Normally, at least one of the shafts of the engine is utilised to provide drive for an auxiliary mechanism. The auxiliary mechanism usually comprises an electrical machine.

Normally, the bleed devices are scheduled to maintain surge margin between the stages of the engine.

Preferably, the bleed devices are scheduled in time dependent order.

BRIEF DESCRIPTION OF THE DRAWINGS

Embodiments of the present invention will now be described by way of example only and with reference to the accompanying drawings in which.

DETAILED DESCRIPTION OF THE INVENTION

Figure 1:
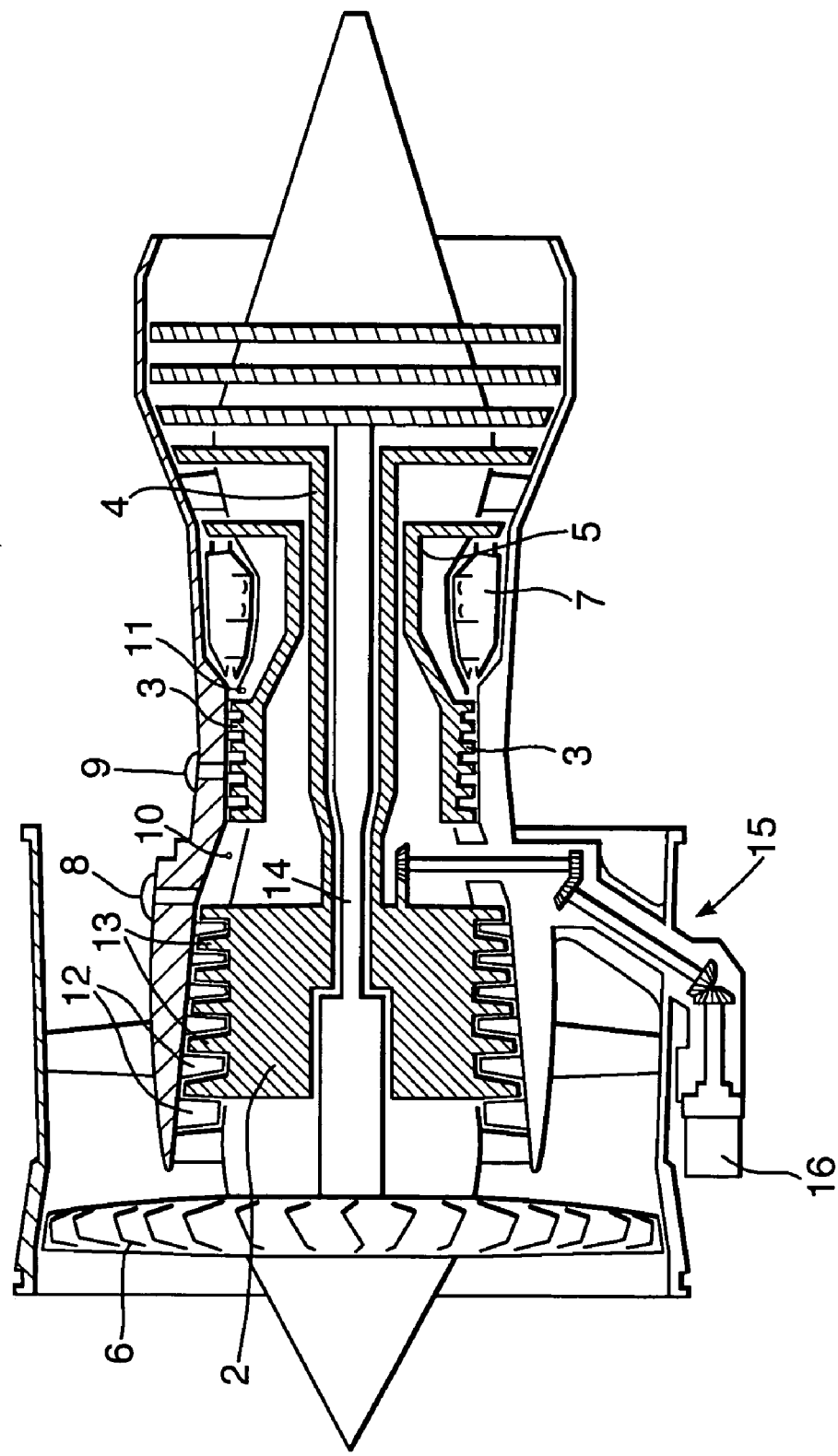
FIG. 1 is a cross section of an engine arrangement.

Referring to FIG. 1 providing a schematic cross section of an engine arrangement 1 in which an intermediate compressor 2 is associated with a high pressure compressor 3 through shafts 4, 5 which are arranged to rotate coaxially within the arrangement 1. It will also be understood that a low pressure compressor 6 is also provided. General operation of a gas turbine engine is known and operates through a process of drawing air through the compressors 6, 2, 3 into the arrangement 1 and mixing the compressed air with a fuel and combustion in combustors 7 such that subsequent turbine stages receive the expanded gas in order to drive the compressors 2, 3, 6 and also provide thrust for the arrangement 1.

Each of the compressors 2, 3 comprises a number of stages 11, 12 which are constituted by an annular array of radially extending aerofoils, either vanes 11 or rotor blades 12.

As indicated above, typically a shaft which previously has normally been the high pressure shaft 3 but in the example shown is the intermediate shaft 4 will be associated with an appropriate gearbox in order to drive auxiliary mechanisms such as electrical power generators. These auxiliary mechanisms will drain power from the shaft 4 and therefore create imbalances. It will be understood that power may be taken from any shaft and this will cause imbalances. Thus, in the arrangement shown the IP shaft will be associated with the gearbox but this could equally be the LP or HP shafts.

In order to resolve these imbalances bleed valves 8, 9 are provided. Typically, a number of valves 8, 9 will be provided about the circumference of the arrangement 1 in order to provide possibly in respect of the intermediate bleed valve 8 four off take ports about the arrangement 1 and potentially with regard to the high pressure bleed valve 9 in the order of three off take ports. As indicated, these valves 8, 9 bleed air flow from the compressor stages of the arrangement 1 in order to balance engine arrangement 1 operation within desired surge values as described above. These valves 8, 9 will therefore be addressable in order to provide scheduling of opening with regard to air flow leakage for desired balance. Such control will be provided through a controller device which is associated with sensors 10, 11 located appropriately within the flow path at different stations or parts of the arrangement 1 to determine particular parameters for the flow through the arrangement 1. The parameter will normally be flow pressure or pressure ratio.

By the above arrangement the sensors 10, 11 will provide parameters which are compared with reference values for such parts of the arrangement 1 in order to determine an appropriate scheduling and adjustment of the valves 8, 9.

In accordance with certain aspects of the present invention the adjustments of the valves 8, 9 is dependent upon the amount of power extracted in order to drive auxiliary devices 16 such as electrical power generators 16. In such circumstances the divergences of the parameters determined by the sensors 10, 11 with regard to the reference values will be indicative of imbalances due to power extracted as indicated typically from the intermediate shaft 4 by a gear train 15 in order to drive the electrical power generator 16 or other auxiliary device 16.

In a first embodiment in accordance with certain aspects of the present invention the amount of engine rematching is achieved by measuring parameters at different stations or ports (e.g. 11, 12) throughout the engine. These parameters can then be compared to reference values to determine the current level of power extraction. This knowledge can then be used to schedule appropriate opening of leakage bleed valves in the appropriate locations of the engine.

In a large three shaft turbofan, embodying power extraction from the intermediate pressure (IP) shaft traditional bleed scheduling would open IP handling bleed valves 8, 9 at idle powers because the intermediate pressure compressor surge margin was reduced. However, when high levels of power off take are being taken the intermediate pressure compression working line is much lower and this bleed is not required. In addition the large power off take means that the engine must rematch and the high pressure compressor operating point is forced up its working line to a very high level. In this case having IP bleed valves open causes a further increase in the high pressure operating point to a region where further increases in flow begin to reduce the high pressure compression surge margin. This is particularly felt when carrying out a rapid transient acceleration from idle. This embodiment would identify when high power off take conditions occur and would schedule intermediate pressure bleed closure by changing the trip speeds which operate the intermediate pressure handling bleed valves 8, 9 by means of a speed bias.

For three shaft engines with power extraction from the high pressure shaft 5 the embodiment could still be used to select the optimum bleeds based on the different rematching that would take place.

Figure 2:
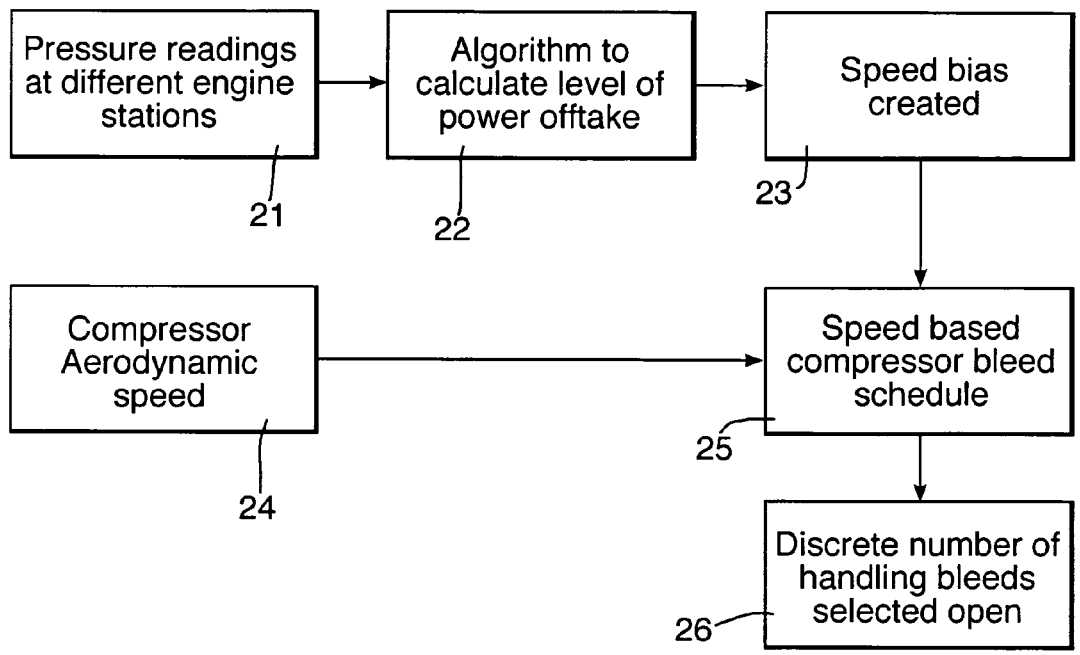
FIG. 2 is a block diagram illustrating engine control in accordance with a first embodiment of the present invention.

FIG. 2 provides a block diagram illustrating the first embodiment method in accordance with certain aspects of the present invention. Thus, pressure parameters 21 are determined at a number of different engine positions, stations or parts (shown as 10, 11 in FIG. 1). These values are compared in a comparator 22 with reference values utilising an algorithm to determine the level of power off take due to the differences between the determined parameters and the reference values. A speed bias 23 is created for shaft rotations. Actual compressor speed 24 is determined and the speed bias created and the actual compressor speed determined compared in a comparator 25 in order to create necessary discrete scheduled openings of bleed valves 8, 9 in order to achieve balance by a controller 26.

In a second embodiment in accordance with certain aspects of the present invention the effect of engine rematching is identified directly by changes in the compressor pressure ratios. These changes are then used to suitably schedule handling bleed by means of lowest wins logic between two competing bleed schedules. In this case the traditional bleed schedule based on corrected speed is used to protect the compressor surge margin under low power off take conditions. A second bleed schedule based on a suitable pressure ratio is used to protect the second compressor when it is affected by rematching caused by high power off take conditions.

With an engine arrangement this second engine control method is used to schedule operation of intermediate pressure handling bleed valves. A corrected speed schedule is used to protect the intermediate pressure compressor surge margin. In addition a high pressure compressor pressure ratio schedule is used to protect the high pressure compressor by closing intermediate pressure bleed under very high power off take conditions.

Figure 3:
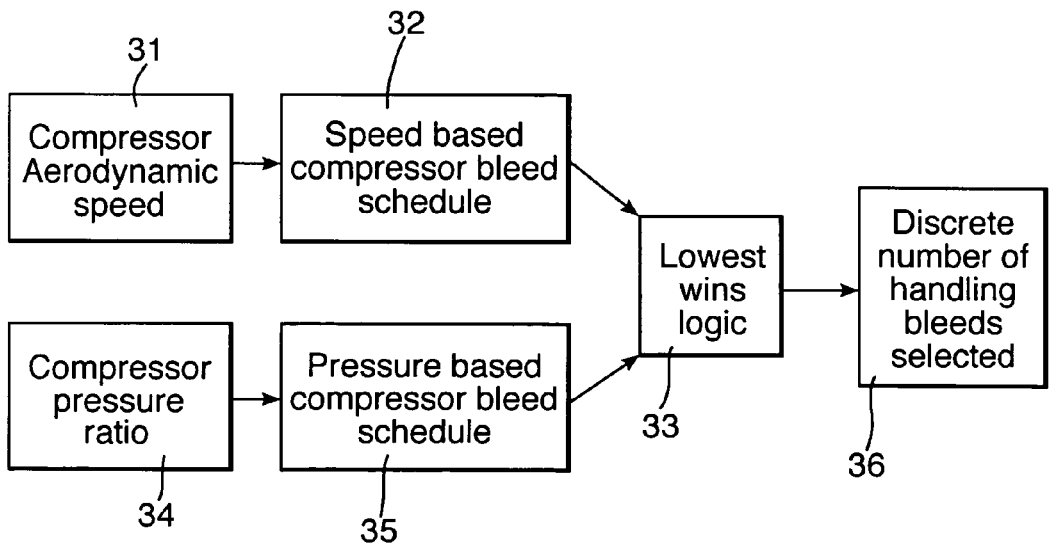
FIG. 3 is a block diagram illustrating a second embodiment of an engine control in accordance with certain aspects of the present invention; and, FIG. 4 is a block diagram illustrating a third embodiment of an engine control in accordance with certain aspects of the present invention.

FIG. 3 provides a block diagram illustrating the second embodiment of an engine control method in accordance with certain aspects of the present invention. Thus, as indicated above a compressor aerodynamic speed determinator 31 is utilised in order to generate a speed based compressor bleed schedule 32 which is fed to a logic comparison device 33. Similarly, a compressor pressure ratio value ratio is provided by comparing in a comparator 34 parameters at different parts or stations within an engine arrangement to give a compressor based bleed schedule 35 provided dependent upon that compressor ratio parameter 34. The logic comparison device 33 will then compare the bleed valve values determined by the respective compressor speed consideration 32 and the compressor pressure ratio consideration 35 to determine actually used bleed valve scheduling 36. The logic comparison device 33 will then take the lowest valve setting as the operational settings for the bleed valves in the arrangement. In short, parameters are utilised in order to determine the necessary bleed valve settings within an arrangement dependent upon compressor aerodynamic speed with respect to compressor pressure ratio differences and then a controller, that is to say device 33, utilised in order to determine the most appropriate bleed valve settings and schedule based upon a lowest denominator approach.

Figure 4:
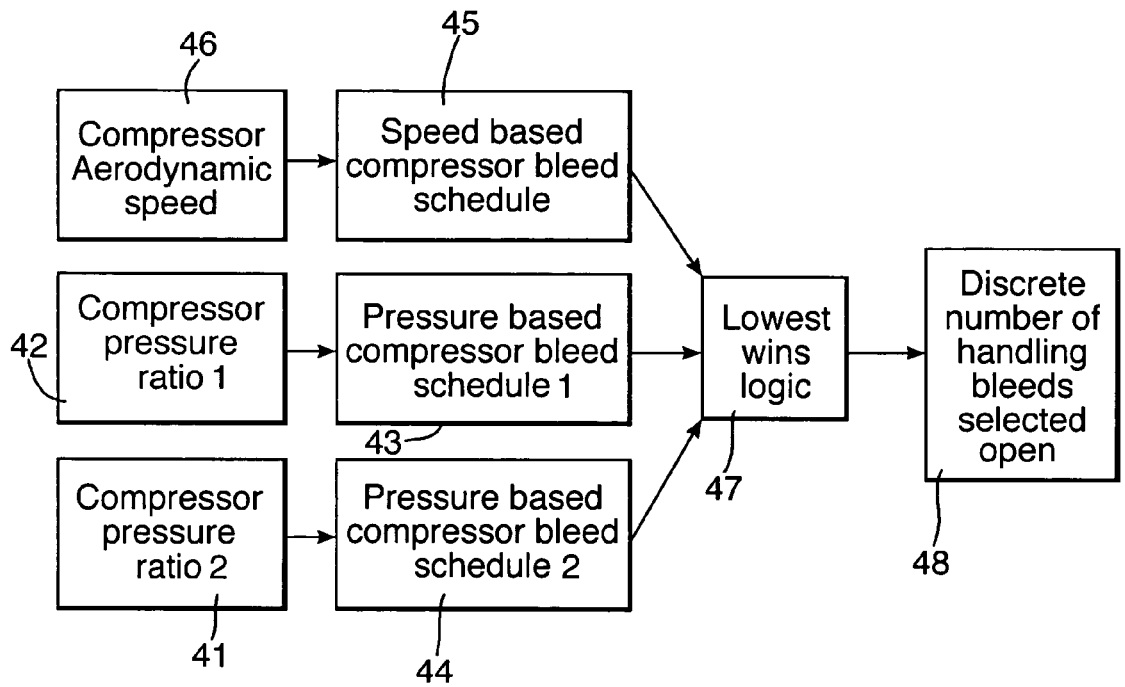

A development of this second embodiment can be provided in a third embodiment of an engine control method in accordance with certain aspects of the present invention. This method is illustrated in FIG. 4. A lower working line on the compressor attached to the shaft providing the large generator power is used to schedule handling bleed at lower engine speeds thereby gaining a benefit in fuel burn at part power conditions. This embodiment can be combined with the second embodiment to provide a solution that protects compressor surge margin and delivers the most efficient engine cycle.

The intermediate pressure compressor handling bleed valves may be controlled by a corrected speed based schedule 45 provided by considering compressor speed 46 to a high pressure compressor pressure ratio schedule 44 and an intermediate pressure compressor pressure ratio schedule 43. Each schedule 43, 44, 45 runs in parallel and lowest denominator wins logic is provided in a comparator 47 applied to select the appropriate bleed valve opening schedule 48.

With this third embodiment it will therefore be understood that particular sets of pressure ratio parameter valves in an engine arrangement can be utilised in order to provide more appropriate or tailored bleed valve settings 43, 44. In such circumstances more specific engine control can be achieved by effectively biasing the arrangement to operate at particular times towards the most significant parameter 43, 44 within the engine. Thus, if the power takeoff to the auxiliary device 16 is from the intermediate pressure compressor then its pressure ratio may be the most appropriate for determining the appropriate scheduling of bleed valves 8, 9 to operate the engine most efficiently. In such circumstances dependent upon the engine operational mode the bleed valve configuration and scheduling can be tailored accordingly.

Each embodiment of aspects of the invention uses measurements of parameters throughout the gas turbine to identify the rematching of the compressors caused by large core power extraction (15, 16) and schedule handling bleed accordingly. This allows the gas turbine to maintain adequate surge margins in all compressor stages whilst providing any level of power offtake required by the customer electrical generators or other auxiliary mechanisms. This allows operation down to much lower idle levels than would be the case with the prior art control systems. This is achieved whilst optimizing the engine cycle and therefore improving the specific fuel consumption of the engine.

In all the embodiments other combinations of bleeds could be scheduled depending on the particular engine configuration and bleed location. For example bleed scheduling for interstage bleeds could be included as engine rematching due to large power off take has significant implications for the utility of interstage bleed. Depending on the operating point of the compressor opening interstage bleed may give a rise or a fall in the compressor surge margin due to the changes in both surge line and working line.

In a specific example for a three shaft engine with intermediate pressure power off take and interstage high pressure bleeds each embodiment above could be used to schedule interstage high pressure bleed based measurement of pressures at different stages throughout the engine as well as the high pressure compressor's non dimensional speed.

In view of the above it will be appreciated that the present engine control method may be utilised in any gas turbine engine consisting of more than one shaft where large amounts of power are extracted from any shaft typically by auxiliary devices causing engine shaft speed mismatching which must be adjusted. In such circumstances although described with regard to aircraft engines, it will also be understood that where auxiliary devices and electrical power generators are driven from shafts whether they be used in the aeronautical or marine or industrial environments, the variations in load can be adjusted by appropriate scheduling of the bleed valves to achieve the desired rematching of engine shaft speeds.

Thus in summary the present invention is a method of operating a gas turbine engine 1 comprising a number of compressor stages 12, 13 within either the LP or HP compressors 2, 3, the method comprising determining a parameter for each of a number of parts 10, 11 of the engine 1, comparing each parameter with a reference value for that part 10, 11 of the engine (1) and adjusting one or more of the bleed valves 8, 9 associated with one or more of the stages 12, 13, which is dependent on the comparison of the parameter with the reference value, and importantly the comparison is simultaneous with one parameter comparison having the authority to override the other to adjust either of the bleed valve 8, 9, in order to avoid driving either the IP or HP compressor 2, 3 into surge in the case of high power offtake via the gear drive 15 and/or auxiliary generator 16. In one favoured example, the pressure ratio parameter overrides the engine speed parameter to progressively adjust the bleed valve 8, 9 in order to avoid driving the HP compressor into surge in the case of high power off-take.

We claim:

1. A method of controlling a gas turbine engine to reduce an imbalance between compressor stages, the gas turbine engine comprising at least two compressor stages each having an associated bleed device and an associated pressure sensor for determining a pressure in the compressor stage, and at least one of the compressor stages having an associated shaft from which power can be extracted to drive an electrical device or auxiliary device, the method comprising:

measuring a pressure in each of the at least two compressor stages using the measuring devices to provide pressure parameters;

measuring a speed of the shaft;

extracting power from the shaft to drive the electrical device or auxiliary device;

comparing the pressure parameters to at least one reference value to determine a first bleed device schedule to reduce an imbalance in the gas turbine engine caused by the power extracted from the shaft, the first bleed schedule having at least one first bleed device value representing a first amount the bleed device is opened;

comparing the speed of the engine shaft to the at least one reference value to determine a second bleed device schedule to reduce an imbalance in the gas turbine engine caused by the power extracted from the shaft, the second bleed schedule having at least one second bleed device value representing a second amount the bleed device is opened; and comparing the first bleed device value to the second bleed device value and using the bleed device schedule having the lowest bleed device value to open the bleed device to reduce the imbalance.

2. A method as claimed in claim 1 wherein the pressure measurement comprises a flow pressure.

3. A method as claimed in claim 1 wherein the pressure measurement comprises measuring a pressure ratio between at least two compressor stages.

4. A method as claimed in claim 3 wherein the measurement of the pressure ratio is utilized to provide at least one of the reference values.

5. A method as claimed in claim 1 wherein the at least one compressor stage comprises any one of the IP or HP compressors.

6. A method as claimed in claim 1 further comprising measuring and engine shaft speed and using the engine shaft speed to provide at least one of the reference values.

7. A method as claimed in claim 6 wherein the engine shaft comprises any one of HP, IP or LP shafts.

8. A method as claimed in claim 1 wherein the at least two compressor stages of the engine are defined by associated shafts of the engine.

9. A method as claimed in claim 1 wherein the auxiliary device is driven by the power taken off of the shaft.

10. A method as claimed in claim 1 wherein the electrical device is driven by power taken off of the shaft.

11. A method as claimed in claim 1 further comprising scheduling the bleed to maintain a surge margin between the compressor stages of the engine.

12. A method as claimed in claim 1 further comprising scheduling the bleed devices in time dependent order.

13. A method according to claim 1, further comprising using a controller in communication with the bleed devices, the pressure sensors, and an engine speed sensor for determining a speed of the shaft.

14. A method according to claim 1, further comprising measuring a pressure parameter in a third compressor stage and preparing a third bleed schedule based on a pressure ratio between the third compressor stage and one of the first or second compressor stages, the third bleed schedule having an associated third bleed device value representing a third amount the bleed device is opened, comparing the first, second and third bleed device values and using the bleed schedule having the lowest bleed device value to control the opening and closing of the bleed valves.

* * * * *

UNITED STATES PATENT AND TRADEMARK OFFICE
CERTIFICATE OF CORRECTION

PATENT NO. : 7,647,778 B2  Page 1 of 1
APPLICATION NO. : 11/591552
DATED : January 19, 2010
INVENTOR(S) : Zewde et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this

Sixteenth Day of November, 2010

David J. Kappos
*Director of the United States Patent and Trademark Office*